(12) United States Patent
Shaw

(10) Patent No.: US 12,352,056 B1
(45) Date of Patent: Jul. 8, 2025

(54) ENVIRONMENTALLY FRIENDLY CONCRETE COMPOSITIONS, INSTALLATIONS, AND METHODS THEREOF

(71) Applicant: Lee Shaw, Newport Beach, CA (US)

(72) Inventor: Lee Shaw, Newport Beach, CA (US)

( * ) Notice: Subject to any disclaimer, the term of this patent is extended or adjusted under 35 U.S.C. 154(b) by 563 days.

(21) Appl. No.: 17/558,206

(22) Filed: Dec. 21, 2021

Related U.S. Application Data

(60) Provisional application No. 63/129,550, filed on Dec. 22, 2020.

(51) Int. Cl.
| | |
|---|---|
| C04B 40/00 | (2006.01) |
| B28B 1/00 | (2006.01) |
| B28B 1/04 | (2006.01) |
| B28B 1/14 | (2006.01) |
| C04B 7/00 | (2006.01) |
| C04B 7/02 | (2006.01) |
| C04B 14/00 | (2006.01) |
| C04B 14/14 | (2006.01) |
| C04B 14/22 | (2006.01) |
| E04C 5/00 | (2006.01) |
| E04C 5/06 | (2006.01) |
| E04G 11/00 | (2006.01) |
| E04G 11/08 | (2006.01) |

(52) U.S. Cl.
CPC .............. E04G 11/08 (2013.01); B28B 1/14 (2013.01); C04B 7/02 (2013.01); C04B 14/14 (2013.01); C04B 14/22 (2013.01); C04B 40/0042 (2013.01); E04C 5/0631 (2013.01)

(58) Field of Classification Search
CPC ............ C04B 7/02; C04B 14/22; C04B 28/04
See application file for complete search history.

(56) References Cited

U.S. PATENT DOCUMENTS

| | | | | |
|---|---|---|---|---|
| 4,509,985 | A * | 4/1985 | Davidovits | ............. C04B 28/26 |
| | | | | 106/624 |
| 5,114,487 | A * | 5/1992 | Gartshore | ............. C04B 28/065 |
| | | | | 106/644 |
| 5,447,752 | A * | 9/1995 | Cobb | ........................ B44F 9/04 |
| | | | | 427/140 |

(Continued)

*Primary Examiner* — Alison L Hindenlang
*Assistant Examiner* — Andres E. Behrens, Jr.
(74) *Attorney, Agent, or Firm* — Rutan & Tucker, LLP; William W. Schaal

(57) ABSTRACT

Environmentally friendly concrete compositions and methods thereof are disclosed. For example, a method for producing an environmentally friendly concrete installation can include mixing cement, one or more locally sourced pozzolans, and one or more locally sourced aggregates to produce a dry concrete mixture. At least one fine aggregate or coarse aggregate of the dry concrete mixture is a locally sourced aggregate of the one-or-more locally sourced aggregates for a reduced carbon footprint. The method can include hydrating the dry concrete mixture with water to make a pourable concrete mixture. The method can include pouring the pourable concrete mixture into a formwork to produce a poured concrete form. The method can include allowing the poured concrete form to cure to produce the concrete installation. The reduced carbon footprint of the concrete installation is relative to that of a similar concrete installation produced without the one-or-more locally sourced pozzolans or aggregates.

18 Claims, 2 Drawing Sheets

(56) References Cited

U.S. PATENT DOCUMENTS

| | | | | |
|---|---|---|---|---|
| 6,016,635 | A * | 1/2000 | Shaw | E04F 21/242 |
| | | | | 52/181 |
| 6,033,146 | A * | 3/2000 | Shaw | E04F 21/00 |
| | | | | 52/742.1 |
| 6,971,784 | B1 * | 12/2005 | Bracegirdle | E01C 7/262 |
| | | | | 366/6 |
| 7,563,017 | B1 * | 7/2009 | Bracegirdle | C04B 28/02 |
| | | | | 366/6 |
| 10,752,837 | B1 * | 8/2020 | Shaw | C04B 41/5353 |
| 11,459,505 | B1 * | 10/2022 | Shaw | C04B 41/5353 |
| 2004/0041295 | A1 * | 3/2004 | Shaw | C04B 41/533 |
| | | | | 264/131 |
| 2007/0144407 | A1 * | 6/2007 | Biscan | C04B 28/006 |
| | | | | 106/819 |
| 2013/0273319 | A1 * | 10/2013 | Chen | C04B 41/009 |
| | | | | 427/261 |
| 2014/0060388 | A1 * | 3/2014 | Sadiq | B82Y 30/00 |
| | | | | 977/734 |
| 2014/0238265 | A1 * | 8/2014 | Sagoe-Crentsil | C04B 28/006 |
| | | | | 106/122 |
| 2019/0062210 | A1 * | 2/2019 | Furmanski | C04B 20/006 |
| 2019/0062214 | A1 * | 2/2019 | Al-Kutti | C04B 28/04 |
| 2019/0127279 | A1 * | 5/2019 | Yancey | C04B 28/04 |
| 2019/0256415 | A1 * | 8/2019 | Jain | C04B 14/34 |

\* cited by examiner

ENVIRONMENTALLY FRIENDLY CONCRETE COMPOSITIONS, INSTALLATIONS, AND METHODS THEREOF

PRIORITY

This application claims the benefit of priority to U.S. Provisional Patent Application No. 63/129,550, filed Dec. 22, 2020, which is incorporated by reference in its entirety into this application.

BACKGROUND

The concrete industry is a necessary industry for our built environment, but the concrete industry is not particularly friendly to our greater environment. For example, the concrete industry is responsible for emitting about 8% of climate-changing greenhouse gases such as carbon dioxide per year largely on account of the production of Portland cement. Just to produce the Portland cement needed for the concrete industry, a manufacturer must pulverize limestone and sinter pulverized limestone with an aluminosilicate source in enormous fossil fuel-powered rotary kilns for more than about 20 hours to produce clinker, an aggregate of calcium silicates such as alite and belite, tricalcium aluminate, and calcium aluminoferrite. Not only is carbon dioxide emitted from combustion of fossil fuels to produce heat for the sintering, but carbon dioxide is also driven off the calcium carbonate that makes up the limestone during the sintering. The clinker is then pulverized into the fine-grained powder known as Portland cement, which is needed by the concrete industry along with fine and course aggregates to produce concrete. But even sourcing and transporting the fine and course aggregates contributes to the greenhouse gases emitted by the concrete industry. In another example, the concrete industry is also responsible for releasing harmful concrete-finishing chemicals into the environment while finishing concrete forms to produce concrete installations. What is needed are environmentally friendly concrete compositions, installations, and methods thereof to lessen the amount of greenhouse gases and harmful concrete-finishing chemicals emitted by the concrete industry.

Disclosed herein are environmentally friendly concrete compositions, installations, and methods thereof.

SUMMARY

Disclosed herein is a method for producing an environmentally friendly concrete installation. The method includes, in some embodiments, a formwork-constructing operation, a mixing operation, a hydrating operation, a pouring operation, and a curing operation. The formwork-constructing operation includes constructing formwork for the concrete installation. The mixing operation includes mixing a cement, one or more locally sourced pozzolans, and one or more locally sourced aggregates to produce a dry concrete mixture. At least one fine aggregate or coarse aggregate of the dry concrete mixture is a locally sourced aggregate of the one-or-more locally sourced aggregates. The hydrating operation includes hydrating the dry concrete mixture with water to make a pourable concrete mixture. The pouring operation includes pouring the pourable concrete mixture into the formwork to produce a poured concrete form. The curing operation includes allowing the poured concrete form to cure to produce the concrete installation with a reduced carbon footprint. The reduced carbon footprint is relative to a carbon footprint of a similar concrete installation produced without the one-or-more locally sourced pozzolans and the one-or more locally source aggregates.

In some embodiments, the dry concrete mixture includes 1 part of the cement together with the one-or-more locally sourced pozzolans, 1 to 5 parts of the fine aggregate, and 2 to 10 parts of the coarse aggregate.

In some embodiments, the dry concrete mixture includes 1 part of the cement together with the one-or-more locally sourced pozzolans, 1.8 to 3 parts of the fine aggregate, and 3 to 4.2 parts of the coarse aggregate.

In some embodiments, the one-or-more locally sourced pozzolans are combined with the cement at a rate of no more than about 60% of the one-or-more locally sourced pozzolans to at least about 40% of the cement by weight.

In some embodiments, the one-or-more locally sourced pozzolans are combined with the cement at a rate of no more than about 30% of the one-or-more locally sourced pozzolans to at least about 70% of the cement by weight.

In some embodiments, the one-or-more locally sourced pozzolans are combined with the cement at a rate of no more than about 20% of the one-or-more locally sourced pozzolans to at least about 80% of the cement by weight.

In some embodiments, the one-or-more locally sourced pozzolans are selected from metakaolin, slag, fly ash, fumed silica, and powdered glass.

In some embodiments, the one-or-more locally sourced aggregates are selected from highly reactive crushed glass and crushed miscellaneous base.

In some embodiments, the mixing operation further includes mixing a synthetic microfiber with the cement, the one-or-more locally sourced pozzolans, and the one-or-more locally sourced aggregates to produce the dry concrete mixture.

In some embodiments, the synthetic microfiber is combined with the cement, the one-or-more locally sourced pozzolans, and the one-or-more locally sourced aggregates at a rate of at least about 0.25 lbs. per cubic yard of the dry concrete mixture.

In some embodiments, the method further includes a fabric-laying operation. The fabric-laying operation includes laying geotextile fabric on a compacted subgrade before formwork-constructing operation, in which the concrete installation is constructed over the geotextile fabric.

In some embodiments, the method further includes a reinforcing-bar ("rebar") support-placing operation and a rebar grid-installing operation. The rebar support-placing operation includes placing a number of recycled plastic rebar chairs between concrete forms of the formwork. The rebar grid-installing operation includes installing a grid of rebar between the concrete forms of the formwork supported by the rebar chairs.

In some embodiments, the method further includes an aggregate-broadcasting operation and an aggregate-working operation. The aggregate-broadcasting operation includes broadcasting one or more seedable aggregates over a surface of the poured concrete form while surface bleed water is evaporating from the poured concrete form. The aggregate-working operation includes working the one-or-more seedable aggregates into the surface of the poured concrete form.

In some embodiments, the method further includes an etching operation and a sealing operation. The etching operation includes etching the surface of the concrete form with an environmentally safe concrete-etching composition to expose one or more seeded aggregates. The sealing operation includes sealing the surface of the concrete form with an environmentally safe concrete sealer.

These and other features of the concepts provided herein will become more apparent to those of skill in the art in view of the accompanying drawings and following description, which describe particular embodiments of such concepts in greater detail.

FIGURES

DESCRIPTION

Figure 1:
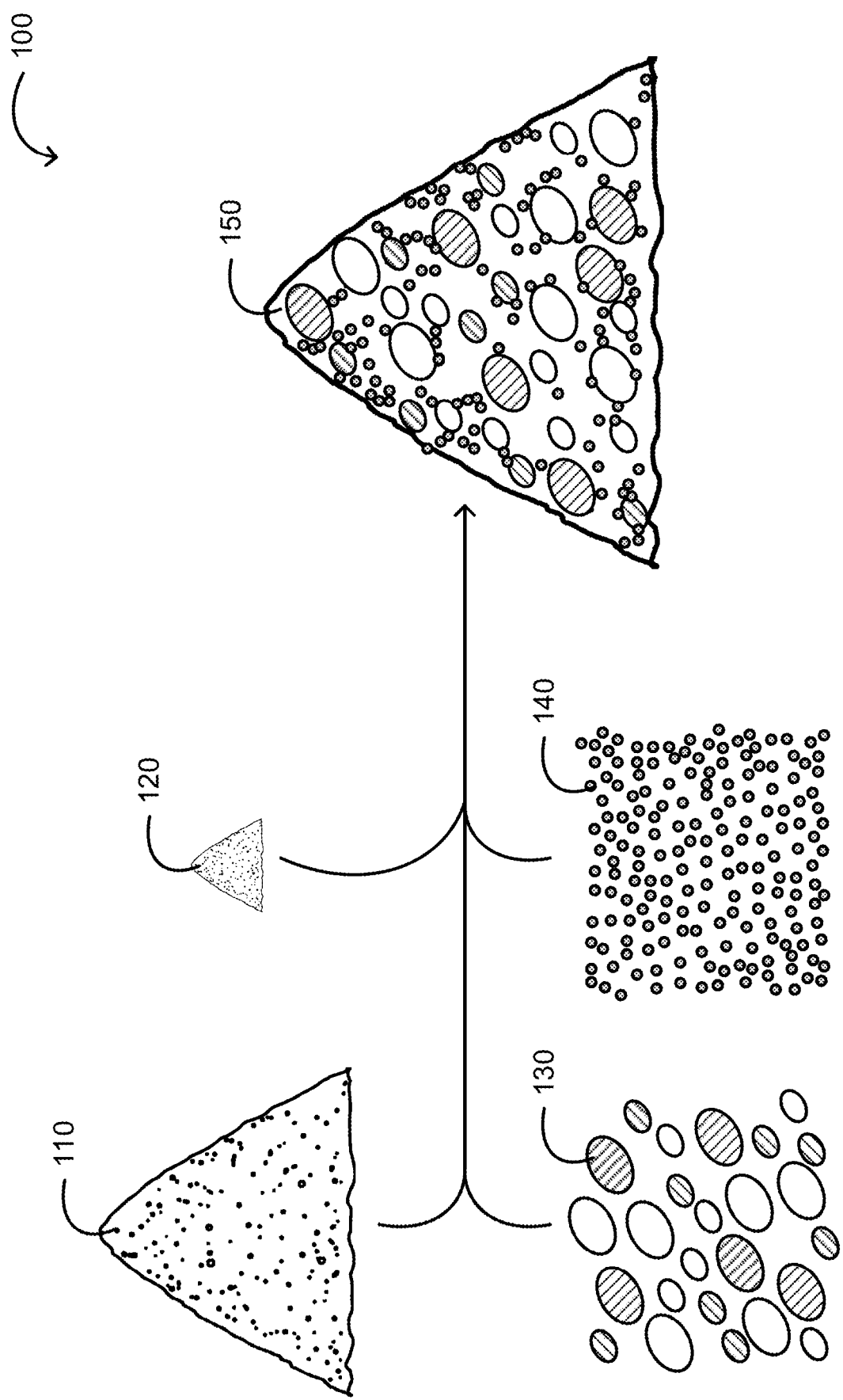
FIG. 1 illustrates a mixing operation for producing a dry concrete mixture having a reduced carbon footprint in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

As set forth above, the concrete industry is responsible for emitting about 8% of the climate-changing greenhouse gases such as carbon dioxide per year largely on account of the production of Portland cement, as well as the sourcing and transporting of the fine and course aggregates for the concrete produced with the Portland cement. In addition, the concrete industry is also responsible for releasing harmful concrete-finishing chemicals into the environment while finishing concrete forms to produce concrete installations. What is needed are environmentally friendly concrete compositions, installations, and methods thereof to lessen the amount of greenhouse gases and harmful concrete-finishing chemicals emitted by the concrete industry.

Disclosed herein are environmentally friendly concrete compositions, installations, and methods thereof, wherein each environmentally friendly concrete composition or installation is produced in accordance with a method including one or more operations selected from those below for producing environmentally friendly concrete installations. It should be understood that in producing an environmentally friendly concrete installation in accordance with the one-or-more operations set forth below, whether that concrete installation is structural or architectural, a reduced carbon-footprint concrete composition is also generally produced for the installation. The reduced carbon footprint of the concrete composition or installation produced therefrom is relative to a carbon footprint of a similar concrete composition or installation produced without one or more carbon footprint-reducing operations set forth below such as using the one-or-more locally sourced pozzolans or the one-or more locally source aggregates.

A method for producing an environmentally friendly concrete installation can include a subgrade-compacting operation. The subgrade-compacting operation includes compacting a subgrade to produce a compacted subgrade for the environmentally friendly concrete installation. In accordance with the subgrade-compacting operation, the subgrade can be compacted up to at least 90% relative compaction. Notably, over compacting the subgrade is to be avoided in the subgrade-compacting operation since the subgrade-compacting operation is performed with heavy equipment. Over compacting the subgrade can result in combusting more fossil fuel for running the heavy equipment than required, which can, in turn, increase the carbon footprint of the concrete installation instead of reducing it.

A method for producing an environmentally friendly concrete installation can include a fabric-laying operation. The fabric-laying operation includes laying a geotextile fabric (e.g., a Mirafi® geotextile fabric) on a subgrade such as the compacted subgrade before the formwork-constructing operation set forth below. The geotextile fabric is configured to stabilize the subgrade and mitigate intrusion of moisture into any concrete installation be it a structural or architectural concrete installation installed over the geotextile fabric.

A method for producing an environmentally friendly concrete installation can include a fill-placing operation. The fill-placing operation includes placing up to at least 4" of fill over the subgrade and the geotextile fabric if placed thereover in the fabric-laying operation, as well as compacting the fill up to at least 90% relative compaction. The fill can include one or more locally sourced aggregates such as any of the one-or-more locally sourced aggregates set forth below. For example, the fill can include crushed miscellaneous base ("CMB"), washed concrete sand, or both; however, the CMB should be free or petroleum-related products such as the bitumen of asphalt concrete. As set forth above with respect to over compacting the subgrade, over compacting the fill is to be avoided in the fill-placing operation since the fill-placing operation is also performed with heavy equipment. Over compacting the fill can result in combusting more fossil fuel for running the heavy equipment than required, which can, in turn, offset the reduction gained from using the one-or-more locally sourced aggregates for the fill-placing operation. Indeed, over compacting the fill can increase the carbon footprint of the concrete installation instead of reducing it.

Figure 2:
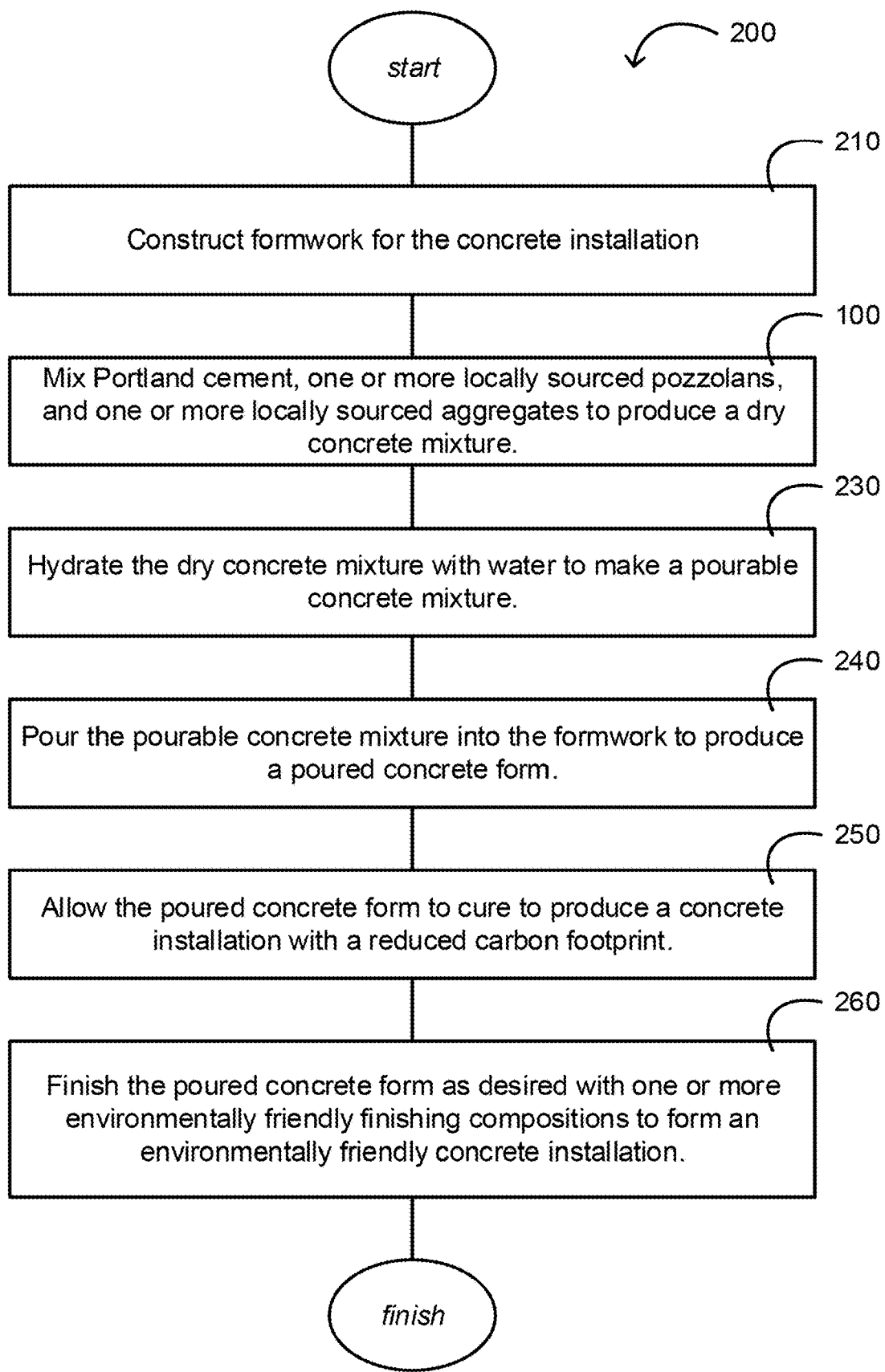
FIG. 2 illustrates a method for producing an environmentally friendly concrete installation in accordance with some embodiments.

A method for producing an environmentally friendly concrete installation can include a formwork-constructing operation as shown in operation 210 of the method 200 of FIG. 2. The formwork-constructing operation can, in turn, include one or more suboperations selected from a concrete forms-constructing operation, a rebar support-placing operation, a rebar grid-installing operation, and a slip dowel-installing operation for constructing formwork for the concrete installation. The concrete forms-constructing operation can include constructing lumber-based concrete forms to true line and grade using flat-bar stock-steel stakes. The rebar support-placing operation can include placing a number of rebar supports such as recycled plastic rebar chairs between the concrete forms of the formwork. The rebar chairs being made of recycled plastic instead of concrete like so-called dobie blocks reduces the carbon footprint of the concrete installation. In addition, the plastic of the rebar chairs being recycled plastic ensures the plastic is locked in the built environment instead of polluting the greater environment. The rebar grid-installing operation can include installing a grid of rebar (e.g., 18"×18" grid of 40- or 60-grade rebar) between the concrete forms of the formwork supported by the rebar chairs. Optionally, rebar of the grid of rebar is coupled to dowels of rebar extending from outer faces of one or more existing concrete installations such as from slip dowels in the one-or-more concrete installations. While the rebar can be carbon steel rebar, the rebar can alternatively be epoxy-coated rebar, galvanized rebar, glass-fiber-reinforced polymer ("GFRP") rebar, stainless steel rebar, or any combination of the foregoing. The slip dowel-installing operation can include installing a number of slip dowels on inner faces of the concrete forms such as every 18".

A method for producing an environmentally friendly concrete installation can include a mixing operation 100 as shown in FIG. 1 as well as by operation 100 of the method 200 of FIG. 2. The mixing operation can include mixing cement 110 (e.g., Portland cement or a combination of Portland cement with one or more other cementitious materials), one or more pozzolans 120, and one or more aggregates such as coarse aggregate 130 and fine aggregate 140 to produce a dry concrete mixture 150 having a concrete mix design set forth below. At least one pozzolan of the one-or-more pozzolans or at least one aggregate of the one-or-more aggregates should be locally sourced for producing the environmentally friendly concrete installation, thereby reducing the carbon footprint of the environmentally friendly concrete installation by reducing the amount of fossil fuels combusted for transporting the one-or-more pozzolans or the one-or-more aggregates. In an example, the mixing operation can include mixing the cement, one or more locally sourced pozzolans, and one or more locally sourced aggregates to produce a dry concrete mixture, wherein at least one fine aggregate or coarse aggregate of the dry concrete mixture is a locally sourced aggregate of the one-or-more locally sourced aggregates.

Insofar as the concrete mix design, the dry concrete mixture can include about 1 part of the cement (e.g., Portland cement or the combination of Portland cement with the one-or-more other cementitious materials) together with the one-or-more pozzolans in a cementitious mixture, about 1 to 5 parts of the fine aggregate, and about 2 to 10 parts of the coarse aggregate such as about 1 part of the cement together with the one-or-more pozzolans in the cementitious mixture, about 1.8 to 3 parts of the fine aggregate, and about 3 to 4.2 parts of the coarse aggregate. For example, the dry concrete mixture can include 1 part of the cement together with the one-or-more pozzolans in the cementitious mixture, about 5 parts of the fine aggregate, and about 10 parts of the coarse aggregate; 1 part of the cement together with the one-or-more pozzolans in the cementitious mixture, about 4 parts of the fine aggregate, and about 8 parts of the coarse aggregate; 1 part of the cement together with the one-or-more pozzolans in the cementitious mixture, about 3 parts of the fine aggregate, and about 6 parts of the coarse aggregate; 1 part of the cement together with the one-or-more pozzolans in the cementitious mixture, about 2 parts of the fine aggregate, and about 4 parts of the coarse aggregate; 1 part of the cement together with the one-or-more pozzolans in the cementitious mixture, about 1.5 parts of the fine aggregate, and about 3 parts of the coarse aggregate; or 1 part of the cement together with the one-or-more pozzolans in the cementitious mixture, about 1 part of the fine aggregate, and about 2 parts of the coarse aggregate.

Further to the concrete mix design, the one-or-more pozzolans can be combined with the cement (e.g., Portland cement or the combination of Portland cement with the one-or-more other cementitious materials) in the cementitious mixture at a rate of at least about 10% to no more than about 60% of the one-or-more pozzolans to no more than about 90% to at least about 40% of cement by weight, respectively, to produce the cementitious mixture. For example, the one-or-more pozzolans can be combined with the cement in the cementitious mixture at a rate of no more than about 60% of the one-or-more pozzolans to at least about 40% of the cement by weight, including no more than about 50% of the one-or-more pozzolans to at least about 50% of the cement by weight, such as no more than about 40% of the one-or-more pozzolans to at least about 60% of the cement by weight, no more than about 30% of the one-or-more pozzolans to at least about 70% of the cement by weight, no more than about 20% of the one-or-more pozzolans to at least about 80% of the cement by weight, no more than about 15% of the one-or-more pozzolans to at least about 85% of the cement by weight, no more than about 10% of the one-or-more pozzolans to at least about 90% of the cement by weight, or no more than about 5% of the one-or-more pozzolans to at least about 95% of the cement by weight to produce the cementitious mixture. If the one-or-more pozzolans are locally sourced, the carbon footprint of the environmentally friendly concrete installation can be reduced up to the rate of the one-or-more pozzolans in the cementitious mixture.

The one-or-more pozzolans in and of themselves generally have little to no cementitious properties but can react with calcium hydroxide in the presence of water at ambient air temperatures to form compounds having cementitious properties when the one-or-more pozzolans are in finely divided form. The one-or-more pozzolans can be selected from metakaolin, slag, fly ash, fumed silica, and powdered glass. Advantageously, pozzolans such as metakaolin, fumed silica, and fly ash reduce the amount of alkali hydroxides in the pourable or poured concrete mixture set forth below by replacing the cement source thereof, thereby reducing the potential for the deleterious alkali-silica reaction and increasing options for aggregate (e.g., reactive aggregate including highly reactive crushed glass). Not only that but such pozzolans can provide better flow rates of the pourable concrete mixture, improved fine aggregate-cement paste (e.g., sand-cement paste) to hold the one-or-more seedable aggregates in the surface of the poured concrete set forth below, and provide up to at least a 25% increase in compressive and flexural strength in the environmentally friendly concrete installation. Metakaolin is further advantageous in that it provides waterproof and chloride-resistant concrete. The powdered glass can be recycled from plate glass, bottle glass, or the like, which is easily sourced locally. Such powdered glass should have particles≤300 μm for sufficient performance as a pozzolan. Even if not locally sourced, the one-or-more pozzolans still reduce the carbon footprint of the concrete installation as the one-or-more pozzolans replace a portion of the cement in the dry concrete mixture and, for example, do not require sintering in rotary kilns like that in producing clinker for Portland cement.

The one-or-more aggregates can be selected from highly reactive crushed glass and CMB. The CMB can include recycled concrete, which is easily sourced locally.

Further to the mixing operation, the mixing operation can include mixing a synthetic microfiber with the cement (e.g., Portland cement or the combination of Portland cement with the one-or-more other cementitious materials), the one-or-more pozzolans, and the one-or-more aggregates to produce the dry concrete mixture. The synthetic microfiber (e.g., polypropylene microfiber) can be combined with the cement, the one-or-more pozzolans, and the one-or-more aggregates at a rate of at least about 0.25 lbs. per cubic yard of the dry concrete mixture. Advantageously, the synthetic microfiber mitigates freeze-thaw, minimizes shrinkage cracks, improves load capacity, improves ductile strength, improves matrix cohesion, improves abrasion resistance, imparts higher shear and flexural strengths, augments reinforcing steel, and replaces any need for welded wire mesh in the environmentally friendly concrete installation.

A method for producing an environmentally friendly concrete installation can include a hydrating operation as shown in operation 230 of the method 200 of FIG. 2. The hydrating operation can include hydrating the dry concrete mixture with water to make a pourable concrete mixture using a water-cement ratio of about 0.5 to 1.1. For example, the dry concrete mixture including 1:5:10 of the cementitious mixture (i.e., the cement together with the one-or-more pozzolans) to fine aggregate to coarse aggregate can have a water-cement ratio of about 1.1; the dry concrete mixture including 1:4:8 of the cementitious mixture to fine aggregate to coarse aggregate can have a water-cement ratio of about 0.85; the dry concrete mixture including 1:3:6 of the cementitious mixture to fine aggregate to coarse aggregate can have a water-cement ratio of about 0.65; the dry concrete mixture including 1:2:4 of the cementitious mixture to fine aggregate to coarse aggregate can have a water-cement ratio of about 0.6; the dry concrete mixture including 1:1.5:3 of the cementitious mixture to fine aggregate to coarse aggregate can have a water-cement ratio of about 0.55; and the dry concrete mixture including 1:1:2 of the cementitious mixture to fine aggregate to coarse aggregate can have a water-cement ratio of about 0.5.

A method for producing an environmentally friendly concrete installation can include a water reducer-adding operation. The water reducer-adding operation can include adding a water reducer (e.g., a mid-range water reducer such as SikaPlast®-300 GP) to the pourable concrete mixture. Advantageously, such a water reducer reduces concrete shrinkage and cracking of the environmentally friendly concrete installation.

A method for producing an environmentally friendly concrete installation can include a pouring operation as shown in operation 240 of the method 200 of FIG. 2. The pouring operation includes pouring the pourable concrete mixture into the formwork to produce a poured concrete form.

A method for producing an environmentally friendly concrete installation can include a coarse-finishing operation. The coarse-finishing operation can, in turn, include one or more suboperations selected from a vibrating operation, a screeding operation, and a floating operation. The vibrating operation can include vibrating the poured concrete form with lithium battery-powered vibrators to remove air bubbles from the poured concrete form. The screeding operation can include screeding the poured concrete form with a screed to bring a surface of the poured concrete form to the proper elevation. The floating operation can include floating the poured concrete form with a metal, wood, fiberglass, or composite concrete float to smoothen the surface of the poured concrete form and remove imperfections therefrom.

A method for producing an environmentally friendly concrete installation can include an aggregate-seeding operation. The aggregate-seeding operation can, in turn, include one or more suboperations selected from an aggregate-broadcasting operation, an aggregate-working operation, an aggregate-covering operation, and a troweling operation. The aggregate-broadcasting operation can include broadcasting one or more seedable aggregates (e.g., reactive or non-reactive aggregates) over a surface of the poured concrete form by hand, by shovel, mechanically, or pneumatically while surface bleed water is evaporating from the poured concrete form. The aggregate-working operation can include working the one-or-more seedable aggregates into the surface of the poured concrete form such as by a metal, wood, fiberglass, or composite concrete float. Alternatively, the aggregate-working operation includes, for at least larger seedable aggregates, working the one-or-more seedable aggregates into the surface of the poured concrete form by a lithium battery-powered vibrator to seed the one-or-more seedable aggregates as one or more seeded aggregates. The aggregate-covering operation can include covering the one-or-more seeded aggregates with a fine aggregate-cement paste (e.g., sand-cement paste), thereby embedding the one-or-more seeded aggregates in the surface of the poured concrete form. Optionally, the aggregate-seeding operation can further include one or more suboperations of the coarse-finishing operation such as the vibrating operation, the screeding operation, or the floating operation. The troweling operation can include troweling the poured concrete form including the one-or-more seeded aggregates with a power trowel such as a gasoline-, electric-, or propane-powered trowel once the poured concrete form can support the power trowel. The trowel can include metal, polymeric (e.g., polytetrafluoroethylene), GFRP, or composite blades to effectively align the one-or-more seeded aggregates in a flat plane with the power trowel.

The one-or-more seedable aggregates can be rounded aggregate, crushed aggregate, or both rounded and crushed aggregates ranging in size from $\frac{1}{64}$" to 6" in diameter on average. Such aggregate can include, but is not limited to, limestone, granite, marble, soapstone, beach or river pebbles, slate, slag, pumice, mica, spar, feldspar, silica carbide, seashells, crushed glass, light-reflective synthetics, recycled aggregates, carbon pellets, glass tiles, mosaic tiles, and coarse, carbon fibers.

A method for producing an environmentally friendly concrete installation can include a curing operation as shown in operation 250 of the method 200 of FIG. 2. The curing operation includes allowing the poured concrete form to cure to produce the environmentally friendly concrete installation.

If desired, a method for producing an environmentally friendly concrete installation can include a first fine-finishing operation, which is generally shown in operation 260 of the method 200 of FIG. 2. The first fine-finishing operation can, in turn, include one or more suboperations selected from a power-grinding operation, a surface-rinsing operation, an etching operation, and a sealing operation.

The power-grinding operation can include power grinding the surface of the poured concrete form to a consistently flat ground surface a number of days (e.g., 7 days) after the sealing operation.

The surface-rinsing operation can include rinsing the ground surface of the poured concrete form with potable water to produce a rinsed, ground surface of the poured concrete form.

The etching operation can include applying to the rinsed, ground surface of the poured concrete form an environmentally safe concrete-etching composition of urea and acetic acid as disclosed in U.S. Pat. No. 10,752,837, the entirety of which is incorporated herein by reference, to produce a slip-resistant surface of the poured concrete form suitable for wet environments. Since the concrete-etching composition is environmentally safe, additional instances of the surface-rinsing operation can be performed as needed.

The sealing operation can include applying to the slip-resistant surface of the poured concrete form an environmentally safe concrete sealer (e.g., a siloxane concrete sealer) to produce a sealed and waterproofed concrete surface of the environmentally friendly concrete installation. While the potential for the deleterious alkali-silica reaction is already reduced in the environmentally friendly concrete installation on account of the one-or-more pozzolans, the sealed concrete surface keeps water from seeping into the environmentally friendly concrete installation, which further reduces the potential for the alkali-silica reaction. The potential for the alkali-silica reaction is further reduced because the reaction needs water to occur. Not only that, but water is also needed for the sodium silicate formed by the alkali-silica reaction to swell and cause damage to concrete.

If desired, a method for producing an environmentally friendly concrete installation can include a second fine-finishing operation different than the first-fine finishing operation, which is generally shown in FIG. 2. The second fine-finishing operation can, in turn, include one or more suboperations selected from an initial etching operation, an initial washing operation, an initial sealing operation, a final etching operation, a final washing operation, and a final sealing operation.

The initial etching operation can include applying to the surface of the poured concrete form an etching-retarder mixture of the environmentally safe concrete-etching composition of U.S. Pat. No. 10,752,837 mixed with a concrete surface retarder including an organic alcohol such as a glycol (e.g., ethylene glycol). Again, the environmentally safe concrete-etching composition is disclosed in U.S. Pat. No. 10,752,837, the entirety of which is incorporated herein by reference. Optionally, the second fine-finishing operation can further include a covering operation. The covering operation includes covering the surface of the poured concrete form with one or more plastic sheets after applying the etching-retarder mixture to retain moisture during periods of low humidity.

The initial washing operation can include washing the surface of the poured concrete form with a power washer at, for example, at least about 1000 psi to remove etchate (i.e., material etched from the surface of the poured concrete) from an etched surface of the poured concrete form and reveal the one-or-more seeded aggregates. If the second fine-finishing operation includes the covering operation, the one-or-more plastic sheets can be removed before the initial washing operation provided the etching-retarder mixture has had sufficient time (e.g., about 2 hours) for the initial etching operation.

Optionally, the second fine-finishing operation can further include an additional etching operation if cement paste and laitance remain on the etched surface of the poured concrete form. The additional etching operation can include applying a dilution (e.g., a 50% dilution) of the environmentally safe concrete-etching composition of urea, acetic acid, and biodegradable hydrochloric acid with potable water. If the second fine-finishing operation includes the additional etching operation, an additional washing follows the additional etching operation. The additional washing operation can include washing the etched surface of the poured concrete form with a power washer at, for example, at least about 75 psi up to about 2000 psi. Advantageously, the environmentally safe concrete-etching composition need not be captured and disposed at a hazardous-materials disposal site.

Optionally, the second fine-finishing operation can further include a coloring operation. The coloring operation can include applying an environmentally safe colorant such as a stain or a dye to the etched surface of the poured concrete form. Advantageously, the environmentally safe colorant avoids highly toxic and environmentally harmful muriatic acid-based colorants.

The initial sealing operation can include applying to the etched surface of the poured concrete form an environmentally safe concrete sealer (e.g., a siloxane concrete sealer) to produce a sealed and waterproofed concrete surface of the poured concrete form. Again, while the potential for the deleterious alkali-silica reaction is already reduced in the poured concrete form on account of the one-or-more pozzolans, the sealed concrete surface keeps water from seeping into the poured concrete form, which further reduces the potential for the alkali-silica reaction.

Optionally, the second fine-finishing operation can further include a saw-cutting operation. The saw-cutting operation can include cutting the poured concrete form with a saw to provide decorative, architectural, or crack-control features in the poured concrete form.

The final etching operation can include applying to at least the sealed surface of the poured concrete form the environmentally safe concrete-etching composition of urea and acetic acid to produce a final etched surface of the poured concrete form. The final etching operation can be performed after, for example, 7 days of curing in accordance with the curing operation. Again, the environmentally safe concrete-etching composition need not be captured and disposed at a hazardous-materials disposal site.

The final washing operation can include washing the final etched surface of the poured concrete form with a power washer at, for example, at about 2000 psi to remove etchate, dirt, or the like from the final etched surface of the poured concrete form.

The final initial sealing operation can include applying to the final etched surface of the poured concrete form an environmentally safe concrete sealer (e.g., a siloxane concrete sealer) to produce a sealed and waterproofed concrete surface of the poured concrete form resistant to resist oil, acid rain, hydraulic fluids, animal waste, and food stains for at least about 20 years, thereby producing the environmentally friendly concrete installation.

A method for producing an environmentally friendly concrete installation can include a wrapping operation and drainboard-installing operation, particularly for concrete structures having foundation walls, retaining walls, plaza decks, or the like. The wrapping operation includes wrapping the concrete installation with a waterproof wrap or membrane (e.g., MiraDRI 860/861 by Carlisle Coatings & Waterproofing of Wylie, TX). The drainboard-installing operation includes installing a fabric-covered, dimpled drainboard (e.g., MiraDRAIN by Carlisle Coatings & Waterproofing of Wylie, TX) over the waterproof wrap.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A method for producing an environmentally friendly concrete installation, comprising:
    constructing formwork for the concrete installation;
    mixing a cement, one or more pozzolans, and one or more aggregates to produce a dry concrete mixture,
    mixing a synthetic microfiber with the dry concrete mixture at a rate of at least about 0.25 lbs. per cubic yard of the dry concrete mixture;
    hydrating the dry concrete mixture with water to make a pourable concrete mixture;
    pouring the pourable concrete mixture into the formwork to produce a poured concrete form; and
    allowing the poured concrete form to cure to produce the concrete installation.

2. The method of claim 1, wherein the dry concrete mixture includes 1 part of the cement together with the one-or-more pozzolans, 1 to 5 parts of fine aggregate, and 2 to 10 parts of coarse aggregate.

3. The method of claim 1, wherein the dry concrete mixture includes 1 part of the cement together with the one-or-more pozzolans, 1.8 to 3 parts of fine aggregate, and 3 to 4.2 parts of coarse aggregate.

4. The method of claim 1, wherein the one-or-more pozzolans are combined with the cement at a rate of no more than about 60% of the one-or-more pozzolans to at least about 40% of the cement by weight.

5. The method of claim 1, wherein the one-or-more pozzolans are combined with the cement at a rate of no more than about 30% of the one-or-more pozzolans to at least about 70% of the cement by weight.

6. The method of claim 1, wherein the one-or-more pozzolans are combined with the cement at a rate of no more than about 20% of the one-or-more pozzolans to at least about 80% of the cement by weight.

7. The method of claim 1, wherein the one-or-more pozzolans are selected from metakaolin, slag, fly ash, fumed silica, and powdered glass.

8. The method of claim 1, wherein the one-or-more aggregates are selected from crushed glass and crushed miscellaneous base.

9. The method of claim 1, further comprising:
    laying geotextile fabric on a compacted subgrade before constructing the formwork for the concrete installation over the geotextile fabric.

10. The method of claim 1, further comprising:
    placing a number of recycled plastic reinforcing-bar ("rebar") chairs between concrete forms of the formwork; and
    installing a grid of rebar between the concrete forms of the formwork supported by the rebar chairs.

11. The method of claim 1, further comprising:
    broadcasting one or more seedable aggregates over a surface of the poured concrete form while surface bleed water is evaporating from the poured concrete form; and
    working the one-or-more seedable aggregates into the surface of the poured concrete form.

12. The method of claim 11, further comprising:
    etching the surface of the concrete form with an environmentally safe concrete-etching composition to expose one or more seeded aggregates; and
    sealing the surface of the concrete form with an environmentally safe concrete sealer.

13. A method for producing an environmentally friendly concrete installation, comprising:
    constructing formwork for the concrete installation;
    mixing cement, one or more pozzolans, and one or more aggregates to produce a dry concrete mixture,
        wherein the dry concrete mixture includes 1 part of the cement together with the one-or-more pozzolans, 1 to 5 parts of fine aggregate, and 2 to 10 parts of coarse aggregate;
    mixing a synthetic microfiber with the dry concrete mixture at a rate of at least about 0.25 lbs. per cubic yard of the dry concrete mixture;
    hydrating the dry concrete mixture with water to make a pourable concrete mixture;
        pouring the pourable concrete mixture into the formwork to produce a poured concrete form; and
    allowing the poured concrete form to cure to produce the concrete installation.

14. The method of claim 13, wherein the one-or-more pozzolans are combined with the cement at a rate of no more than about 60% of the one-or-more pozzolans to at least about 40% of the cement by weight.

15. The method of claim 13, wherein the one-or-more pozzolans are selected from metakaolin, slag, fly ash, fumed silica, and powdered glass.

16. The method of claim 13, wherein the one-or-more aggregates are selected from crushed glass and crushed miscellaneous base.

17. The method of claim 13, further comprising:
    placing a number of recycled plastic reinforcing-bar ("rebar") chairs between concrete forms of the formwork; and
    installing a grid of rebar between the concrete forms of the formwork supported by the rebar chairs.

18. A method for producing an environmentally friendly concrete installation, comprising:
    constructing formwork for the concrete installation;
    mixing a synthetic microfiber with cement, one or more pozzolans selected from metakaolin, slag, fly ash, fumed silica, and powdered glass, and one or more aggregates selected from crushed glass and crushed miscellaneous base to produce a dry concrete mixture,
        wherein the dry concrete mixture includes 1 part of the cement together with the one-or-more pozzolans, 1.8 to 3 parts of fine aggregate, and 3 to 4.2 parts of coarse aggregate, and
        wherein the one-or-more pozzolans are combined with the cement at a rate of no more than about 20% of the one-or-more pozzolans to at least about 80% of the cement by weight;
    mixing a synthetic microfiber with the dry concrete mixture at a rate of at least about 0.25 lbs. per cubic yard of the dry concrete mixture;
    hydrating the dry concrete mixture with water to make a pourable concrete mixture;

pouring the pourable concrete mixture into the formwork to produce a poured concrete form; and allowing the poured concrete form to cure to produce the concrete installation.

* * * * *